United States Patent [19]

Robinson

[11] Patent Number: 4,572,787

[45] Date of Patent: Feb. 25, 1986

[54] ARRANGEMENT FOR CYCLONE ASSEMBLIES FOR CLEANING LIQUID SUSPENSIONS

[76] Inventor: William Robinson, Odengatan 4, S-114 24 Stockholm, Sweden

[21] Appl. No.: 666,958

[22] PCT Filed: Feb. 24, 1984

[86] PCT No.: PCT/SE84/00066

§ 371 Date: Oct. 12, 1984

§ 102(e) Date: Oct. 12, 1984

[87] PCT Pub. No.: WO84/03236

PCT Pub. Date: Aug. 30, 1984

[30] Foreign Application Priority Data

Feb. 24, 1983 [SE] Sweden ................................ 8301045

[51] Int. Cl.[4] .......................... B01D 21/26; B04C 5/28

[52] U.S. Cl. .................................. 210/512.2; 209/211

[58] Field of Search ............................... 209/144, 211; 210/512.2; 55/346, 347, 348, 349

[56] References Cited

U.S. PATENT DOCUMENTS 2,670,056 2/1954 Rossiter ............................ 55/346 X
2,956,679 11/1960 Hoffmann ........................... 209/144
3,415,374 12/1968 Wikdahl ............................ 55/349 X
3,543,931 12/1970 Rastatter ...................... 210/512.2 X
3,598,731 8/1971 Frykhutt et al. ............... 209/211 X
3,959,123 5/1976 Wikdahl .............................. 209/211
3,959,150 3/1976 Frykhult et al. ................. 210/512.2
4,019,980 4/1977 Beery ........................... 210/512.2 X
4,148,721 4/1979 Brown et al. ........................ 209/211
4,148,722 4/1979 Surakka et al. ...................... 209/211
4,208,270 6/1980 Griev et al. ...................... 285/187 X
4,437,984 3/1984 King et al. ........................ 55/346 X
4,462,899 7/1984 Wambsgans .................... 209/144 X

*Primary Examiner*—Frank W. Lutter
*Assistant Examiner*—Thomas M. Lithgow
*Attorney, Agent, or Firm*—Flynn, Thiel, Boutell & Tanis

[57] ABSTRACT

According to the invention a plurality of hydrocyclones (10) for cleaning liquid suspensions are combined to form uniform packages (80), each of which comprises, for example, ten hydrocyclones. The central part of each cyclone package is made up of a double chamber, one part of which is intended for the supply of the inject, i.e. the phase of the suspension which is to be cleaned, while the other part is intended for the removal of the cleaned phase, or accept. The double chamber preferably consists of a pair of twin conduits (65, 70), that is to say, two collecting conduits disposed tightly adjacent and parallel with each other, for receiving and delivering the respective suspension phases from the cyclones. The cyclones (10) are designed to be connected to the twin conduits via leak-tight pipe connections of the sleeve type, such as those known as chevron couplings (50), for example. This means that each separate cyclone (10) can be pushed plug-fashion into its position in the package (80) and at the same time can be connected leak-tightly to the twin conduits (65, 70). To do this, the cyclones are manipulated by their reject end, i.e. the end where the suspension phase in which impurities are entrained emerges, preferably through a transparent glass unit (40) so that the appearance of the stream of reject in the package can be observed.

A plurality of such cyclone packages (80) may be assembled together in various configurations to form larger hydrocyclone batteries.

7 Claims, 10 Drawing Figures

ARRANGEMENT FOR CYCLONE ASSEMBLIES FOR CLEANING LIQUID SUSPENSIONS

FIELD OF THE INVENTION

The present invention relates to appliances for cleaning liquid suspensions, especially fibre suspensions such as are used in the manufacture of paper.

BACKGROUND OF THE INVENTION

For removing coarser and finer impurities and particles of soil from these suspensions which are used in the paper and pulp industry, more precisely, aqueous suspensions of fibrous pulp, hydrocyclones are used almost exclusively, and have proved particularly suitable for this purpose due to their basically simple construction and the lack of moving parts in most cases. However, the throughflow of fibre suspension in a normal pulp or paper factory is enormous, and for this reason a very great number of these hydrocyclones are necessary to provide an adequate level of cleaning capacity. This gives rise to a whole series of practical problems, for which various solutions have been suggested over the course of the years.

These practical problems can be said basically to be three. Firstly, the great number of cyclones take up a great amount of space if they are lined up in parallel-connected groups, in the most obvious way. Various ways of "packaging" the cyclones have been proposed to solve this problem of space; the best known of these (see, for example, Swedish Pat. No. 200 549) is based on the cyclones being positioned in circular horizontal layers or groups in which they are disposed symmetrically, radially orientated with their tapered ends directed inwards towards a common centre. These layers or assemblies are then piled up on top of each other to the required height, thus providing a compact and space-saving system. However, this does not provide a good solution for the two remaining problems, one of which concerns the monitoring of the operation of the individual cyclones in an assembly. It is known for breakdowns in operation to occur readily in the form of clogging, blockages and the like at the narrow outflow ends of the cyclones where the separated portion of the suspension, containing particles of soil and known as the reject, flows out. It is highly desirable for it to be possible to monitor the flow behaviour at these narrow points visually, since disturbances in the flow are most frequently very clearly visible just here.

The third and by no means least important problem concerns ease of mounting, that is to say, how easy or difficult it is to mount and dismount the individual cyclones in an assembly. A very important object is in fact that each individual cyclone in an assembly should be both readily accessible from the outside and easy to dismount and mount, without other parts of the assembly having to be taken out, to allow intervention or adjustment.

As far as the fibre suspension cleaning plant based on cyclone assemblies which is in use in pulp factories throughout the world is concerned, it cannot be said that a satisfactory solution has been found for these practical constructional problems.

The object of the invention is therefore to provide as comprehensive as possible a solution to these problems, and this object is achieved in that a cyclone package of the type described in the preamble to patent claim 1 is designed according to the invention in the manner indicated in the characterising part of the claim.

SUMMARY OF THE INVENTION

The solution to the above-mentioned problems which is proposed according to the invention is based on the surprising realisation that there exists a geometrically possible arrangement of the individual cyclones in separate assemblies, known as cyclone packages, which can be combined to form a battery wherein the cyclones are packed tightly together and also function as a sort of "plug" which can quickly and easily be taken out of the battery singly, whilst also retaining the above-mentioned highly desirable possibility of observing the reject zone of the cyclones.

BRIEF DESCRIPTION OF THE DRAWINGS

The invention will now be described with reference to the accompanying drawings, on which

FIG. 5 shows a side or plane view of the cyclone package, on a smaller scale than in the previous Figures, while

DESCRIPTION OF THE PREFERRED EMBODIMENTS

Figure 1:
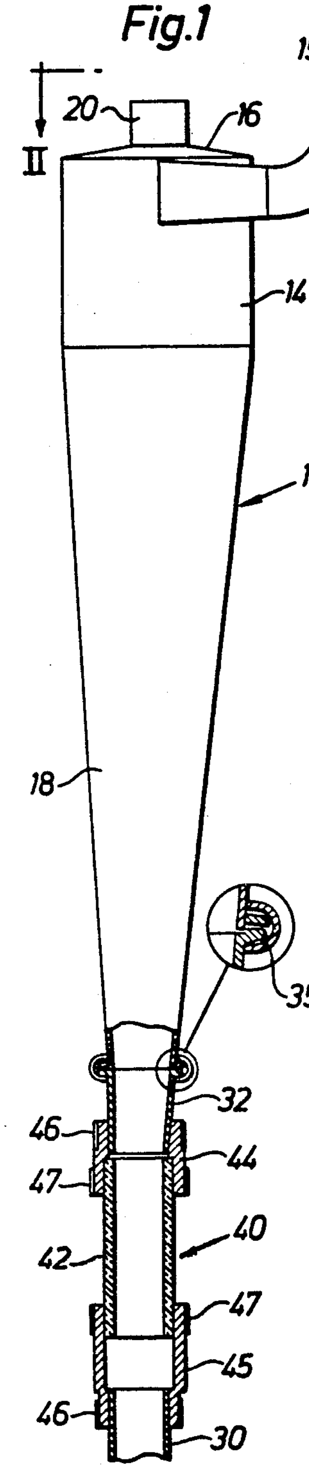
FIG. 1 shows schematically a side or plan view of a single hydrocyclone appertaining to a cyclone package according to the invention.

Thus, FIG. 1 shows a hydrocyclone unit 10 designed to form part of a cyclone package according to the invention and having in a known way an upper inject-accept part and a lower reject part (inject=suspension supplied for cleaning, accept=cleaned suspension, reject=separated, soil-containing suspension). The practical construction of a hydrocyclone is well-known, and the cyclone will be described in this respect only briefly. The inject is introduced through an inlet 12 opening tangentially into the main chamber 14 and located in the upper part of the cyclone, one end face of which is closed off with a cover 16 in the centre of which there is an outlet pipe or a pipe stub 20 through which the accept is delivered. At its opposite end the cyclone tapers in a known way into an elongated conical part 18 which in this case continues into a short connecting piece 32 made of plastic which is connected to the conical end of the cyclone part 18 by means of a split spring-clip 35 of conventional design. The abutting parts are made here with the necessary flanges, as can be seen in the detail drawing inserted in FIG. 1. The connecting piece 32 is joined to a fixed outer reject outlet pipe or pipe union 30 via a transparent glass unit 40. This may quite simply consist of a piece of glass piping or some other transparent piping 42 which is connected between the connecting piece 32 on the conical part of the cyclone and the said reject outlet pipe 30 by means of rubber coupling sleeves 44, 45 and hose clamps 46 and 47. However, the transparent glass unit may also be made as a specially adapted coupling piece which can be pushed on, connecting up the parts 30 and 32 without using special clamps.

Figures 3A, 3B:
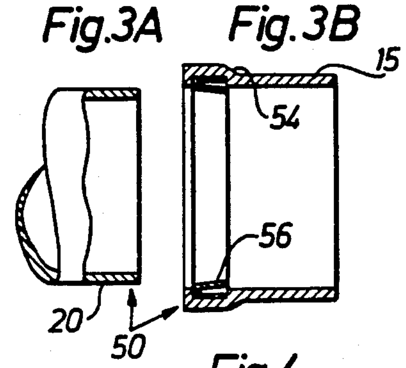
FIGS. 3A and 3B show a section through the male and female parts of a leak-tight sleeve coupling which is used according to the invention.

An important element for achieving the object of the invention is a leak-tight push-on connection which is used to connect the inject-accept part of the cyclone to the fixed pipeline system in the cyclone package. An example of a leak-tight push-on connection of this kind which is especially suitable for the purpose of the invention is shown schematically in FIGS. 3A and 3B. It consists of a so-called chevron coupling 50 which is known per se and which comprises a movable seal of the sealing ring type. FIG. 3A shows the male part of the coupling which, as can be seen, consists of a simple pipe end or pipe stub, an is formed in this case by the above-mentioned accept outlet 20 of the hydrocyclone. The female part of the coupling 50 consists of a tubular sleeve 15 with a wider section 54 at one end, in which an inwardly facing groove is formed. In this groove an elastic sealing ring 56 of a known type is accommodated, having a U-shaped cross-section so that a sealing lip is formed over the inside of the wider section 54, as shown in FIG. 3B. The lip of the sealing ring 56 is thus designed to engage round and seal against the male part 20 when the latter is inserted into the sleeve 15 of the female part. The described arrangement, which appertains to the category of movable axle seals, is known per se and is cited as an example; other similar sealing arrangements could also be used for the purpose of the invention.

Figure 2:
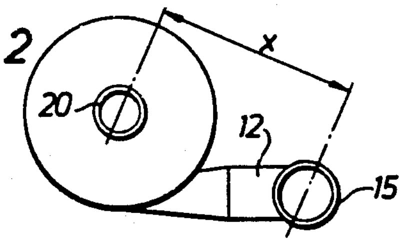
FIG. 2 shows an end view of the cyclone, viewed from the plane indicated with the line II—II in FIG. 1.

As already mentioned, the accept outlet 20 of the cyclone forms the male part of the described chevron coupling 50. A female sleeve part 15 of the coupling is welded or fixed in some other way onto the inject inlet pipe 12 of the cyclone, as shown in FIGS. 1 and 2. When the cyclone is produced suitable fixtures are used for fixing in the two coupling parts so that the perpendicular distance "x" between the centre line of the accept outlet and the centre line of the inject intake are exactly the same in all the cyclones (see FIG. 2).

Figure 4:
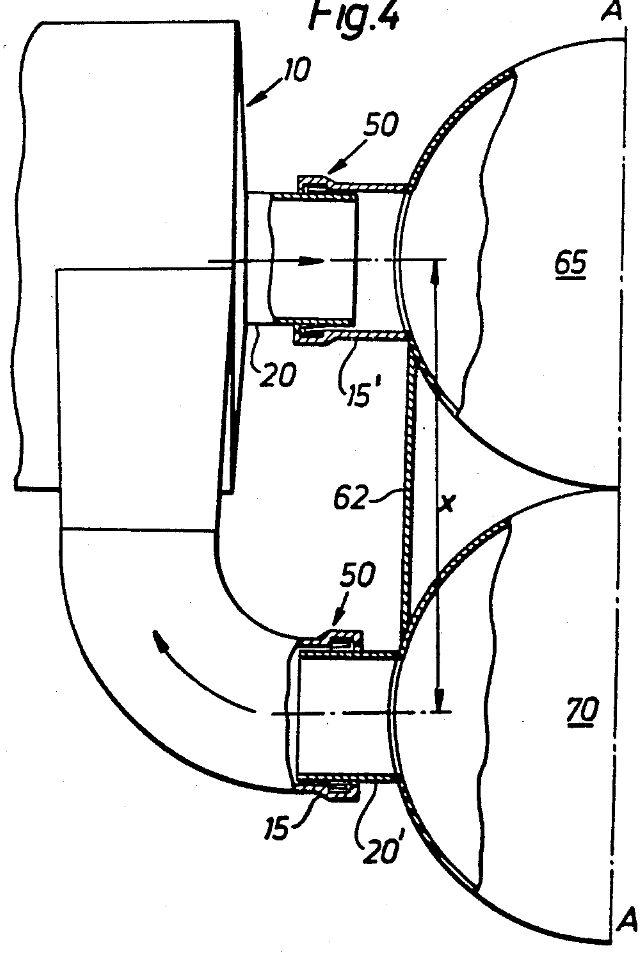
FIG. 4 is a partially sectioned detail of the connection between the inlet and outlet parts of an individual cyclone and a central part of the cyclone package according to the invention.

FIG. 4 shows how the above-described inject-accept part of the cyclone is connected to the adjoining pipeline system. This is formed by a pair of so-called twin conduits consisting of two collecting conduits 65 and 70 for the accept and the inject respectively, which form a central part of the cyclone package according to the invention. The two collecting conduits 65 and 70 thus extend tightly adjacent to each other and mutually parallel, and are joined and jointly braced by means of cover plates 62 disposed on either side, one of which is shown in FIG. 4. Connections for cyclones are provided along the two collecting conduits 65 and 70, the tubular sleeves 15' appertaining to the chevron couplings 50 being welded in along the conduit 65, while pipe stubs 20' which also appertain to the chevron couplings 50 are welded in along the conduit 70. FIG. 4 shows a pair of associated couplings 50, and it should be pointed out that since the dividing plane A—A of the Figure is a plane of symmetry, each twin conduit has two rows of coupling stubs or sleeves disposed on opposite sides.

Here again, suitable fixtures are used in the production of the twin conduit ducting 65, 70 so that the perpendicular distance between the centre lines of the tubular sleeves 15' and pipe stubs 20' is again exactly =x, i.e. the dimension defined above. This enables the inject-accept part of each cyclone to be pushed straight in towards the two conduits 65 and 70, as shown in FIG. 4, and connected leak-tight in this way to the fixed pipeline system of the cyclone package. It will be noted that the male and female parts of the coupling in this case are attached according to the prevailing direction of flow, namely, so that the medium always flows out of the stubs 20 and 20' (see the arrows in FIG. 4). However, it is of course also possible to make the tubular sleeve 15 of the female part with a constructed diameter a short way before the wider section 54 so that this constricted part is endowed with the same internal diameter as the pipe stub 20 and the coupling then has substantially the same through-flow area over all its length. In this case it does not matter which way the coupling is turned, and the arrangement can be made more practical thereby, in that both the twin conduits 65 and 70 are provided with the sleeves 15' of the chevron couplings 50, while both the inject inlet and the accept outlet of the cyclone are made as simple pipe stubs or pipe ends, i.e. corresponding to the male parts 20 of the coupling.

The essential point for the described connection between the inject-accept ends of the cyclones and the two twin conduits disposed in the central part of the package is that the cyclones can be pushed in towards the couplings on the twin conduits so that they are held sealed and supported by the couplings via their subject and accept pipes. This can be effected by holding the outer tapering end of the cyclone and moving the cyclone as a whole into place like a kind of large "push-in plug", as will be described in more detail in the following.

Figure 5:
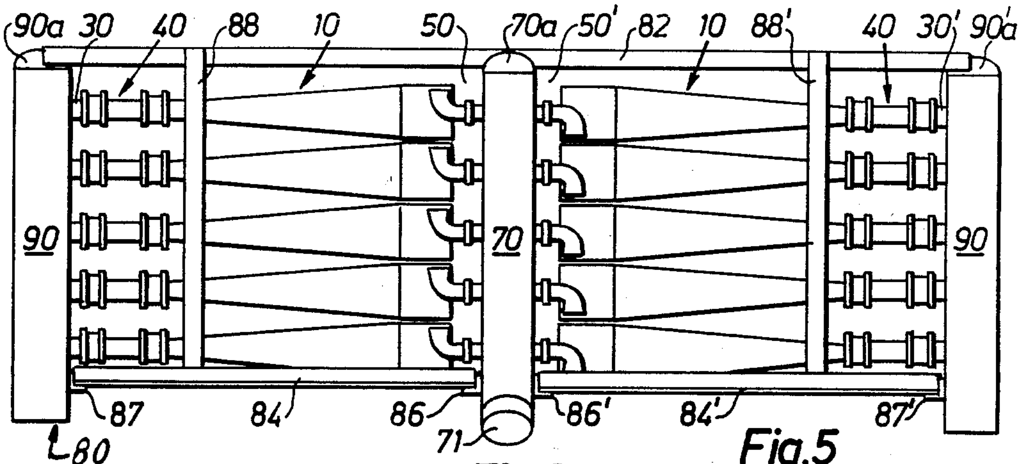
Figure 6:
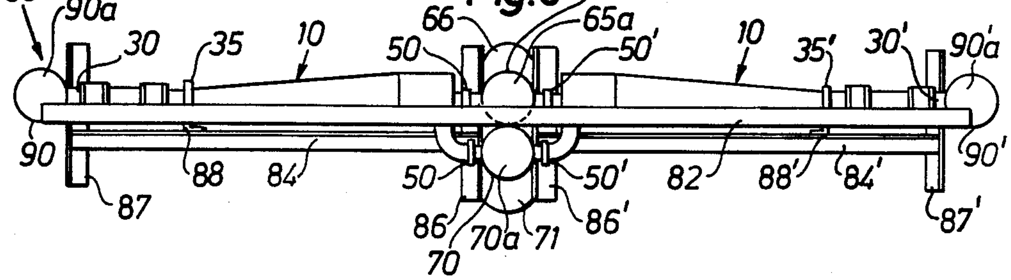
FIG. 6 shows an end view of the package.

FIGS. 5 and 6 show how a plurality of hydrocyclones 10 can be assembled to form a flat, compact cyclone package according to the invention. As can be seen, the cyclone package 80 exemplified in FIGS. 5 and 6 is composed of ten cyclones 10, and the central part or middle of the package is formed by the previously described twin conduits 65 and 70 which thus form the collecting ducts for the accept outlet and inject inlet of the cyclones, respectively, and as can be seen, the cyclones are disposed in co-axial pairs in the package so that the cyclones in each pair extend in opposite directions, out from the central twin conduits 65, 70. Together with the twin conduits, the ten cyclones appertaining to the package are suspended in a frame which can be of any design and, for example, as in this case, may consist of an upper longitudinal beam 82 and lower beams 84 and 84' extending parallel thereto, the latter being connected respectively to each of two crossbeams 86, 86' which are connected to the two twin conduits at the bottom. At their opposite outer ends the beams 84 and 84' are connected to further crosspieces 87 and 87' respectively. As can be seen, these are each attached to their respective vertical collecting conduits 90 and 90', which are provided with pipe unions 30 and 30' respectively, disposed in a vertical, evenly distributed row along the respectively collecting conduits for connecting to the reject outlet parts of the respective cyclones, or more specifically to the transparent glass unit 40 through which the reject passes, as described above with reference to FIG. 1.

The longitudinally extending upper beam 82 is connected to the lower beams 84, 84' via vertical struts 88 and 88', respectively, which are positioned suitably to form outer fixings for the above-described spring-clips 35 which hold together the conical part 18 of each cyclone and the associated connecting piece 32 (see FIG. 1). As mentioned, the spring-clip 35 is split and one half is fixed in a manner which is not shown in detail to a vertical strut 88, 88' respectively (see FIG. 6). Each hydrocyclone 10 is thus supported at its head by the two twin conduits 65, 70 and at its reject outlet end by both the reject collecting conduits 90, 90' and also by its spring-clip 35, 35' fixed to one or other of the vertical struts 88, 88'.

As can be seen, with regard to the outward connection of the said cyclone package 80, i.e. the connection of the various collecting conduits 65, 70 and 90, 90' for the accept, inject and reject respectively, there is a wide range of possibilities for connecting these up, and local conditions will determine whether the different suspension phases will be conducted away upwards or downwards or possibly diverted away in other directions. In the present case, for the sake of simplicity delivery and supply are shown at the bottom, with the twin conduits bent out somewhat to simplify connection, as shown in FIGS. 5 and 6 at 66 and 71. At the top the collecting conduits are closed off with suitable covers 65*a*, 70*a* and 90*a*, 90'*a*, respectively.

It will now be clear how the above-described object of the invention is achieved with the described cyclone package 80 (see particularly FIGS. 5 and 6). Firstly, the package is extremely compact and space-saving; the cyclones lie close together and in the same plane, divided into two opposite groups in an arrangement which requires the minimum of space. Secondly, the accessibility for dismounting and replacing the cyclones and for monitoring is exceedingly good, since access is required only to the ends of the packages. An important feature of the invention is that the head of each cyclone only rests in the connections in the twin conduits 65, 70 via the inject inlet and accept outlet located on the head with a sealed, push-in fit, and therefore without any locking in the axial direction. Such locking is taken care of by the manner in which the cyclones are fixed at their opposite end, the reject outlet end, not only by the spring-clips 35, 35' which are attached to the vertical struts 88, 88', but also by the connection of the transparent glass unit 40 to the reject collecting conduits 90, 90'.

It should now be mentioned that technicians or other supervising personnel positioned at either end of the cyclone package 80 can monitor the flow behaviour of the cyclones which is reflected in the appearance of the reject stream which can be observed through the transparent glass unit 40, and can also easily release and remove a cyclone 10 from the place where it is located. It is not therefore necessary to reach the inner, head end of the cyclone, which is most frequently the least accessible for mounting operations with tightly adjacent cyclones. In this case it is only necessary, for example, to release the two hose clips 46 on the transparent glass unit 40 so that the unit can be moved sufficiently far in on the associated reject pipe stub 30 or 30' on the reject collecting conduit 90 or 90' for the rubber sleeve 44 of the transparent glass unit to release its hold round the adjoining connecting piece 32 of the cyclone; see FIG. 1. If then the free half of the adjoining spring-clips 35,35' is released and removed, the plug-in nature of the opposite fixing allows the cyclone 10 as a whole to be pulled off the coupling parts 15' and 20', respectively.

For supporting the conical parts 18 of the cyclones it is of course not essential to use the spring-clips 35 exemplified here (which are also not required if the conical cyclone casing is adapted to be pushed directly into the rubber sleeve 44 of the transparent glass unit 40 via its end, without the intervention of any connecting piece 32). Other types of fixing for supporting the near, reject end of the cyclones may be proposed by a worker skilled in the art, such as hasps, sprung clips of the snap connection type, etc.

In conclusion, an example is now given of how a plurality of the above-described cyclone packages can be combined to form a comprehensive, compact cyclone battery, with the above-described accessibility for monitoring and mounting operations retained in full, despite the fact that the number of cyclones has been multiplied.

Figure 7:
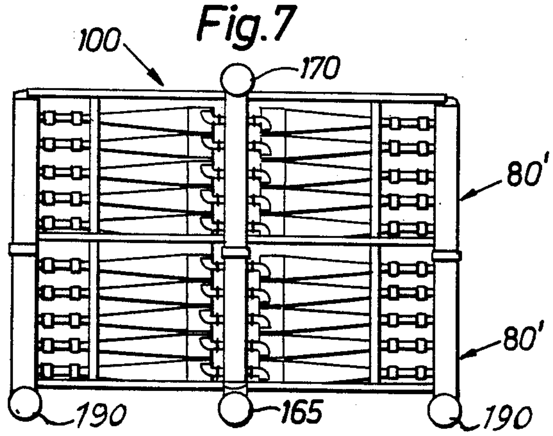
FIGS. 7, 8 and 9 show an embodiment example of a complete cleaning assembly composed of cyclone packages according to the invention, viewed from the front, from the side, and from above, respectively.
Figure 8:
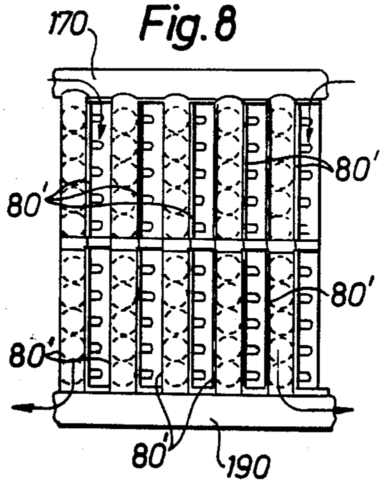
Figure 9:
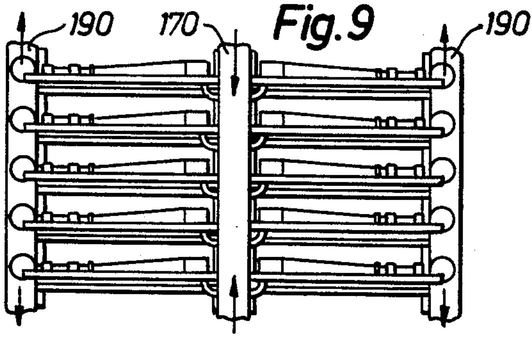

FIGS. 7, 8 and 9 thus show very schematically how a cyclone battery 100 can be built up from, for example, ten packages 80 as described above, and a hundred hydrocyclones accommodated in a minimum amount of space.

In the example shown the battery 100 consists of five pairs of packages 80', the packages in each pair being stacked up on top of each other, after which the pairs of packages thus formed are placed side by side. Within each pair of packages the collecting conduits of the packages are brought together and connected up in an appropriate way, and then the pairs are set side by side and their vertical collecting conduits are connected to transverse collecting ducts of greater diameter, the different pipeline connections being effected by means of conventional coupling device which are not shown in detail. For example, the reject collecting conduits of the packages can open into ducts 190 at the bottom, while the inject is supplied through ducts 170 at the top and the accept is conducted away through ducts 165 at the bottom. As a whole, the battery 100 presents a large number of connection possibilities and local conditions will determine the pipeline layout.

It will now be clearly apparent from FIGS. 7–9 that, for monitoring purposes, the whole of this large battery 100 requires only gangways along two sides, namely, to the right and left of the battery, as viewed from the front in FIG. 7. For each of the one hundred cyclones incorporated in the battery the manipulations described above can be carried out by personnel located on either side of the battery; on either side of each vertical row of cyclones an outwardly facing aperture is formed which is sufficiently wide to allow the transparent glass units to be inspected, and also to allow the desired cyclone to be released and pulled out.

According to circumstances, the described cyclone packages (in which the number of cyclones need not be restricted to a maximum or a minimum of ten) can obviously be combined in many varied ways according to the conditions with regard to space, etc., while still retaining a simple pipework layout and the full accessibility as provided by the invention. As already indicated, with regard to the mechanical details of the cyclone packages the invention is not limited to the embodiment described, but it is anticipated that various modifications known in this field will come within the framework of the invention. In particular, regarding the frame which is required to hold together the separate cyclones appertaining to the cyclone package there are many possible variations, and workers in this field will be able to suggest a number of embodiments within the scope of the invention. With regard to the above-described twin conduits in the central part of the package, these can of course be replaced by any form of double chamber, i.e. a flow chamber divided into two parts, in one of which the inject is conducted, while the accept is conducted in the other. In other respects as well, the invention can be modified without exceeding the concept on which the invention is based.

I claim:

1. A package of hydrocyclones for incorporation in batteries of such cyclones and which are intended for cleaning liquids, said hydrocyclones comprising conventionally elongated, conically tapering elements, each element having a widened base with a tangential inlet for liquid which is to be cleaned, namely the inject, and also having two outlets which are coaxial with the element, one at the base for cleaned liquid, namely the accept, and one at the opposite, tapered end of the element for liquid separated out, namely the reject, collecting conduits for respectively supplying the inject and conducting away the accept and the reject, the hydrocyclones throughout at least part of the package being parallel-connected and connected to said collecting conduits, the cyclones in the package extending mutually parallel and in a substantially common plane on either side of said collecting conduits for said inject and said accept disposed in the center of the package and comprising an inject chamber defined by said inject conduit and an accept chamber defined by said accept conduit, each cyclone having an accept outlet and an inject inlet which are mutually parallel and each formed as one part of a pipe coupling of the male-female kind, said inject and accept collecting conduits being equipped with corresponding mutually parallel pipe coupling parts for co-acting in push-in engagement with the coupling parts on each cyclone to put the accept outlet and the inject inlet of each cyclone in communication respectively with the accept chamber and the inject chamber of said inject and accept collecting conduits, the opposite, reject outlet ends of the cyclones being releasably connected to one of said reject collecting conduits disposed at each end of the cyclone package in parallel with the central inject and accept collecting conduits, such that each separate cyclone can be released at its reject end for repairs or replacement independently of the other cyclones, and pulled out in its longitudinal direction free from the coupling parts on the inject and accept conduits, and removed from the package.

2. A cyclone package according to claim 1, wherein the cyclones in the package are disposed coaxially in pairs, the cyclones in each pair extending out friom the central inject and accept collecting conduits one on each side thereof, the said coupling parts which connect each cyclone with the inject and accept collecting conduits being disposed with their centre line lying in a plane perpendicular to the longitudinal extent of the conduit.

3. A cyclone package according to claim 2 wherein said inject and accept collecting conduits are closely disposed in parallel relationship and are of substantially figure eight cross-sectional shape.

4. A cyclone package according to claim 1, including a transparent wall section, the reject outlet end of each cyclone being made at least partially transparent adjoining its connection to the associated reject collecting conduit by interposition of said transparent wall section between the end of the cyclone and the reject collecting conduit.

5. A cyclone package according to claim 1, including a frame, each package being assembled in a said frame, said frame comprising upper and lower longitudinally extending beams connecting by means of crossbeams, the central inject and accept collecting conduits being disposed in the centre of the frame, perpendicular to the longitudinally extending beams, while the reject collecting conduits form mutually parallel side pieces in the frame, connecting the ends of the longitudinally extending beams, pairs of said cyclones being disposed substantially in the plane of the frame and extending between the central inject and accept collecting conduits and the outer reject collecting conduits.

6. A cyclone battery composed of cyclone packages according to claim 1, wherein the packages are disposed side by side to define parallel planes and thereby form a battery, the central inject and accept collecting conduits of respective packages being connected to inject and accept ducts which are common to the packages, while the reject collecting conduits located at the outer ends of the packages are connected to reject ducts which are common to the packages.

7. A cyclone battery according to claim 6, wherein at least two cyclone batteries are piled up one on top of the other in the height direction, the cyclone packages in each battery having their central inject and accept collecting conduits and outer reject collecting conduits connected to the corresponding conduits in the cyclone packages in an adjacent battery.

* * * * *